(12) United States Patent
Croxford et al.

(10) Patent No.: US 11,010,644 B2
(45) Date of Patent: May 18, 2021

(54) IMAGE PROCESSING

(71) Applicants: Apical Limited, Cambridge (GB); Arm Limited, Cambridge (GB)

(72) Inventors: Daren Croxford, Swaffham Prior (GB); Roberto Lopez Mendez, Cambridge (GB); Alexey Lopich, Loughborough (GB)

(73) Assignees: Apical Limited, Cambridge (GB); Arm Limited, Cambridge (GB)

( * ) Notice: Subject to any disclaimer, the term of this patent is extended or adjusted under 35 U.S.C. 154(b) by 94 days.

(21) Appl. No.: 16/417,213

(22) Filed: May 20, 2019

(65) Prior Publication Data
US 2019/0362180 A1 Nov. 28, 2019

(30) Foreign Application Priority Data

May 24, 2018 (GB) .................................... 1808595

(51) Int. Cl.
*G06K 9/62* (2006.01)
*G06F 16/51* (2019.01)
*G06K 9/00* (2006.01)
*G06N 3/08* (2006.01)

(52) U.S. Cl.
CPC ............. *G06K 9/628* (2013.01); *G06F 16/51* (2019.01); *G06K 9/00718* (2013.01); *G06K 9/6262* (2013.01); *G06N 3/08* (2013.01)

(58) Field of Classification Search
CPC .. G06K 9/628; G06K 9/00718; G06K 9/6262; G06F 16/51; G06N 3/08
See application file for complete search history.

(56) References Cited

U.S. PATENT DOCUMENTS

| | | | | |
|---|---|---|---|---|
| 9,940,539 | B2 * | 4/2018 | Han | .................... G06N 3/0454 |
| 9,953,210 | B1 * | 4/2018 | Rozploch | ............... G07C 9/253 |
| 2016/0140436 | A1 * | 5/2016 | Yin | ....................... G06K 9/4619 706/20 |
| 2016/0321521 | A1 * | 11/2016 | Chen | ..................... G06K 9/6257 |
| 2017/0180723 | A1 | 6/2017 | Chanussot et al. | |
| 2017/0257602 | A1 * | 9/2017 | Axson | ................ H04N 21/2743 |
| 2017/0316284 | A1 * | 11/2017 | Chang | .................. G06K 9/6256 |
| 2019/0347522 | A1 * | 11/2019 | Nir | ....................... G06K 9/6256 |

FOREIGN PATENT DOCUMENTS

| | | |
|---|---|---|
| CN | 106295568 A | 1/2017 |
| CN | 107609601 A | 1/2018 |

OTHER PUBLICATIONS

Combined Search and Examination Report dated Nov. 21, 2018 for United Kingdom Application No. GB 1808595.1.

\* cited by examiner

*Primary Examiner* — Edward Park
(74) *Attorney, Agent, or Firm* — EIP US LLP (57) ABSTRACT

An object classifier using a set of object definitions arranged in an object definition hierarchy including at least a first group of coarse-level object definitions and a second group of finer-level object definitions. The object classifier is arranged to configure a first object classification cycle and a second, subsequent, object classification cycle by selectively executing a first subset of object definitions from the categorization data in the first object classification cycle; and selectively executing a second, different, subset in the second object classification cycle.

19 Claims, 3 Drawing Sheets

IMAGE PROCESSING

CROSS-REFERENCE TO RELATED APPLICATIONS

This application claims the benefit under 35 U.S.C. § 119(a) and 37 CFR § 1.55 to United Kingdom patent application no. GB1808595.1, filed on May 24, 2018, the entire content of which is incorporated herein by reference.

BACKGROUND OF THE INVENTION

Field of the Invention

The present disclosure relates to methods and apparatus for processing image data in the form of sequential image data frames representing a dynamic scene.

Description of the Related Technology

Methods to process image data, for example to detect characteristics of images such as features or objects in the images, may be computationally intensive. There is thus a need for more efficient methods of detecting characteristics of images.

SUMMARY

In a first embodiment, there is provided image processing system comprising:
an image data interface arranged to receive image data in the form of sequential image data frames representing a dynamic scene;
an object classifier arranged to perform object classification in object classification cycles, wherein in a given object classification cycle the object classifier performs object classification in a selected image frame;
storage arranged to store categorization data, the categorization data comprising a set of object definitions for use by the object classifier, the set of object definitions being arranged in an object definition hierarchy and including at least a first group of coarse-level object definitions at a first object definition level and a second group of finer-level object definitions at a second object definition level which is below the first object definition level,
wherein the object classifier is arranged to configure a first object classification cycle and a second, subsequent, object classification cycle by:
selecting a first subset of object definitions from the categorization data, the first subset being selected from at least one of the first and second group object definitions, and selectively executing the first subset in the first object classification cycle; and
selecting a second subset of object definitions from the categorization data, the second subset being selected from at least one of the first and second group object definitions and being different than the first subset; and selectively executing the second subset in the second object classification cycle.

In a second embodiment, there is provided a method of processing image data, the method comprising:
receiving image data in the form of sequential image data frames representing a dynamic scene;
performing object classification in object classification cycles, wherein in a given object classification cycle, object classification is performed in a selected image frame;
storing categorization data, the categorization data comprising a set of object definitions for use during object classification; and
configuring a first object classification cycle and a second, subsequent, object classification cycle by:
selecting a first subset of object definitions from the categorization data, the first subset being selected from at least one of the first and second group object definitions, and selectively executing the first subset in the first object classification cycle; and
selecting a second subset of object definitions from the categorization data, the second subset being selected from at least one of the first and second group object definitions and being different than the first subset; and selectively executing the second subset in the second object classification cycle.

Further features and advantages will become apparent from the following description of examples which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Methods described herein relate to processing image data representative of at least part of an image using an image processing system. The image processing system includes an image data interface arranged to receive image data in the form of sequential image data frames representing a dynamic scene. The image data may for example be image data captured using a video camera. An object classifier may be arranged to perform object classification in object classification cycles, and in a given object classification cycle the object classifier may perform object classification in a selected image frame. The object classifier may be implemented as computer software instructions executed in at least one multi-purpose data processor such as a CPU (central processing unit) or GPU (graphics processing unit), and/or specially-configured hardware computer vision data processors. The image processing system may include storage, for example SDRAM (synchronous DRAM (dynamic random access memory) and/or other kinds of random access memory (RAM), holding categorization data, the categorization data comprising a set of object definitions for use by the object classifier. The set of object definitions may be arranged in an object definition hierarchy including at least a first group of coarse-level object definitions at a first object definition level and a second group of finer-level object definitions at a second object definition level which is below the first object definition level. Alternatively, the set of object definitions may be arranged with first and second groups of object definitions in a flat structure, or other non-hierarchical structure. The object classifier may be arranged to configure a first object classification cycle and a second, subsequent, object classification cycle by selectively executing a first subset of object definitions from the categorization data in the first object classification cycle; and selectively executing a second, different, subset in the second object classification cycle. The first subset may be selected from at least one of the first and second groups of object definitions, and may include object definitions from only one, or both of, the first and second groups of object definitions. The second subset may be selected from at least one of the first and second groups of object definitions, and may include object definitions from only one, or both of, the first and second groups of object definitions. The second subset, whilst being different than the first subset, may include one or object definitions in common with the first subset.

The object definitions may, for example, correspond to classes of objects and conducting object classification may comprise detecting and/or recognising objects belonging to a variety of classes of objects in the image data. For example, the object classifier may be used to detect the presence of a human face in an image, or an animal in the image. In some cases, the object classifier identifies particular instances of an object. For example, a coarse-level object definition may define a human faces class and a finer-level object definition may define an individual face class for identifying a particular human face. As a further example, a coarse-level object definition may define a four-legged animal class and a finer-level object definition may relate to a four-legged animal species class for identifying a particular species of four-legged animal. Further levels of object definitions may be included, for example an individual four-legged animal class, for identifying a particular four-legged animal, may belong to a yet-finer level of object definitions. The first group of object definitions may include different coarse-level object definitions, for example both the human faces class and the four-legged animal class. The second group of object definitions may include different finer-level object definitions, for example both the individual face class and the four-legged animal species class and/or the individual four-legged animal class.

A neural network typically includes a number of interconnected nodes, which may be referred to as artificial neurons, or neurons. The internal state of a neuron (sometimes referred to as an "activation" of the neuron) typically depends on an input received by the neuron. The output of the neuron may then depend on the input, a weight, a bias and an activation function. The output of some neurons is connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network. Examples include an object classifier executing in a neural network accelerator.

Figure 1:
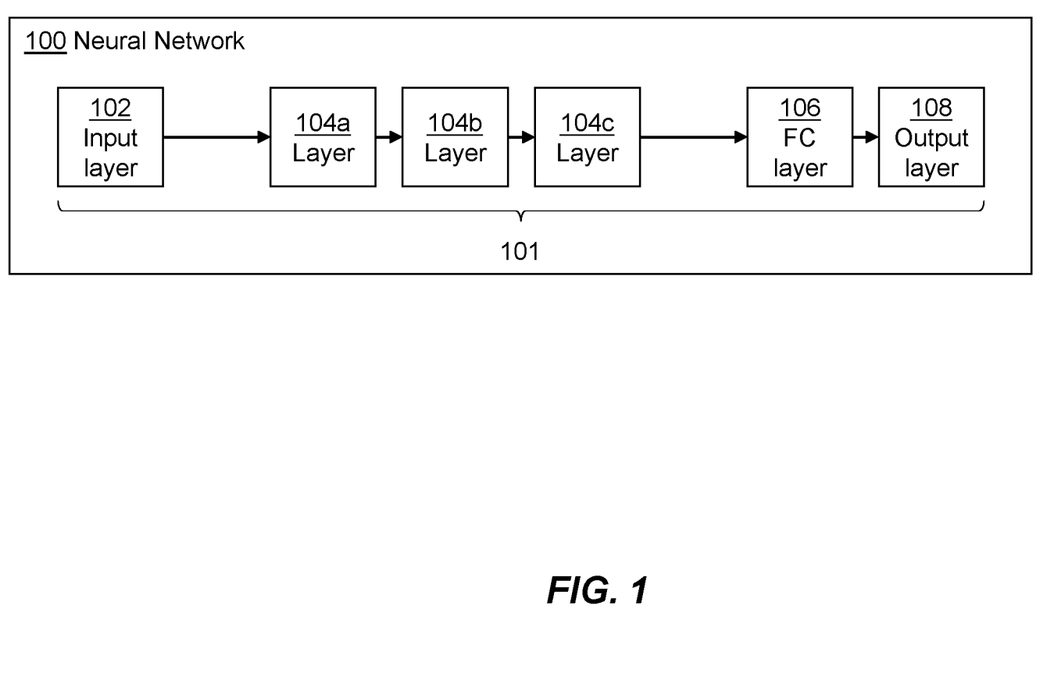
FIG. 1 schematically shows a neural network system according to examples.

FIG. 1 schematically shows a neural network system 100 according to examples. The neural network system 100 comprises a first plurality of layers 101 and the second neural network system 200 comprises a second plurality of layers 201. The second plurality of layers 201 includes more layers than the first plurality of layers 101. In other examples, the second plurality of layers 201 additionally or alternatively includes more neurons and/or more interconnections between neurons than the first plurality of layers 101.

In FIG. 1, the neural network 100 is a convolutional neural network (CNN). An example of a CNN is the VGG-16 CNN, although other CNNs may be used instead. A typical CNN includes an input layer 102, a plurality of convolutional layers (three of which, 104a, 104b, 104c, are shown in FIG. 1), at least one fully connected layer (one of which, 106, is shown in FIG. 1) and an output layer 108. The input layer 102 for example corresponds with an input to the neural network 100, which in this example is image data. The image data is for example 224 pixels wide and 224 pixels high and includes 3 color channels (such as a red, green and blue color channel). The convolutional layers typically extract particular features from the input data, to create feature maps. The fully connected layers then use the feature maps for classification. The fully connected layers execute object definitions, in the form of object classes, to detect the presence of objects conforming to the object classes in the image data. The object definitions are selectively retrieved from storage, and loaded into the object classifier for use during a particular object classification cycle. An object classification cycle may be a cycle in which the image data is passed through the sequence of layers, from the input layer 102 to the output layer 108. Not all layers need be used during an object classification cycle; for example one or more of the convolutional layers may be omitted from processing during an object classification cycle in order to reduce data processing requirements during the cycle.

In examples in accordance with FIG. 1, the output of the layer 104a undergoes pooling before it is input to the layer 104b. Pooling for example allows values for a region of an image or a feature map to be aggregated or combined, for example by taking the highest value within a region. For example, with 2×2 max pooling, the highest value of the output of the layer 104a within a 2×2 patch of the feature map output from the layer 104a is used as an input to the 104b, rather than transferring the entire output of the layer 104a to the layer 104b. This reduces the amount of computation for subsequent layers of the neural network 100. Further pooling may be performed between other layers of the neural network 100. Conversely, pooling may be omitted in some cases. It is to be appreciated that the neural network has been greatly simplified for ease of illustration and that typical neural networks may be significantly more complex.

In general, neural network systems such as the neural network 100 of FIG. 1 may undergo what is referred to as a "training phase", in which the neural network is trained for a particular purpose. As described, a neural network typically includes a number of interconnected neurons forming a directed, weighted graph in which vertices (corresponding to neurons) or edges (corresponding to connections) of the graph are associated with weights, respectively. The weights may be adjusted throughout training, altering the output of individual neurons and hence of the neural network as a whole. In a CNN, a fully connected layer typically connects every neuron in one layer to every neuron in another layer, and may therefore be used to identify overall characteristics of an image, such as whether the image includes an object of a particular class, or a particular instance belonging to the particular class.

In the example of FIG. 1, the neural network 100 has been trained to perform object detection by processing image data, for example to determine whether an object of a predetermined class of objects is present in the image represented by the image data (although in other examples the neural network 100 may have been trained to identify other image characteristics of the image instead). Training the neural network 100 in this way for example generates one or more kernels associated with at least some of the layers (such as layers of the neural network 100 other than the input layer 102 and the output layer 108). Hence, the output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described below.

The kernels may allow features of an image to be identified. For example, some of the kernels may be used to identify edges in the image represented by the image data and others may be used to identify horizontal or vertical features in the image (although this is not limiting, and other kernels are possible). The precise features that the kernels identify may depend on the image characteristics, such as the class of objects, that the neural network 100 is trained to detect. The kernels may be of any size. As an example, each kernel may be a 3×3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3×3 image patch), or each element of a feature map, by a weight in the kernel before adding the result of this operation to the result of the same operation applied to neighboring pixels or neighboring feature map elements. A stride for example refers to the number of pixels or feature map elements a kernel is moved by between each operation. A stride of 1 therefore indicates that, after calculating the convolution for a given 3×3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as a multiply accumulate operation). Thus, a neural network accelerator configured to implement a neural network, such as that of FIG. 3, may include a multiplier-accumulator (MAC) unit configured to perform these operations.

After the training phase, the neural network 100 (which may be referred to as a trained neural network 100) may be used to detect the presence of objects of a predetermined class of objects in input images. This process may be referred to as "classification" or "inference". Classification typically involves convolution of the kernels obtained during the training phase with image patches of the image input to the neural network 100 to generate a feature map. The feature map may then be processed using at least one fully connected layer to classify the image.

In the example of FIG. 1, the layer 104a involves the convolution of 64 different kernels with the image data of the input layer 102. Each of the 64 kernels is, for example, arranged to identify a different respective feature of the image data. In an illustrative example in which the image data is 224×224 pixels in size, with 3 color channels, and is convolved with 64 kernels of a size of 3×3 pixels, the layer 104a of the neural network 100 involves 224×224×3×(3×3)×64 multiply-accumulate operations, i.e. 86 million multiply-accumulate operations. There will also be a large number of further multiply-accumulate operations associated with each of the further layers 104b, 104c, 106 of the neural network 100. As will be appreciated, though, other neural networks may involve convolutions with a different number of kernels. Nevertheless, processing an image to identify an image characteristic such as the presence of an object of a predetermined class, or a particular instance of the object, typically involves a large number of data processing operations, each of which consumes power.

In the example of FIG. 1, image data received by the input layer 102 of the neural network 100 is processed using layers 104a, 104b, 104c to generate feature data. The image data may represent at least one characteristic of the light captured by an image sensor, such as an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data, or may be derived from any such photometric quantity or characteristic. The image data may be in any suitable format, such as a raw image format. For example, the image data may be streamed from the image sensor, with or without being saved to a framebuffer, without saving the raw image data to memory. In such cases, image data obtained after processing of the raw image data may, however, be written to memory.

In this example, the layers 104a, 104b, 104c of the neural network 100 may be used to generate feature data representative of at least one feature of the image. The feature data may represent an output feature map, which may be output from a convolutional layer of a CNN such as the neural network 100 of FIG. 1. There may be more or fewer layers in the neural network 100 than those shown in FIG. 1. In examples in which the neural network 100 includes a plurality of layers 104a, 104b, 104c between the input layer 102 and the fully connected layer 106 and/or the output layer 108, as shown in FIG. 1, each of the said plurality of layers 104a, 104b, 104c may be used to generate intermediate feature data representative of at least one feature of the image. The intermediate feature data output from one of the layers (e.g. layer 104a) may be input to a subsequent layer of the neural network 100 (e.g. layer 104b) to identify further features of the image represented by the image data input to the neural network 100.

Although not shown in FIG. 1, it is to be appreciated that further processing may be applied to the image data after it has been obtained by an image sensor and before it is processed by the layers of the neural network 100. Said further processing may be performed by other components of an image processing system or as part of the neural network 100 itself.

In examples in which the neural network 100 is a CNN, as in FIG. 1, at least one layer of the neural network 100 (in this example, each of the layers 104*a*, 104*b*, 104*c*) may be a convolutional layer, respectively. The neural network 100 also includes a fully connected layer 106, which in FIG. 1 is arranged to receive output feature data from the convolutional layer 104*c*, which for example represents an output feature map, and to process the output feature data to generate object data. The object data for example corresponds with the output layer 108 of the neural network 100. The object data generated by the fully connected layer 106 may provide an indication of whether the neural network 100 has detected the presence of an object of a predetermined class in the image represented by the image data. In FIG. 1, the neural network 100 includes solely one fully connected layer 106. However, in other examples, the neural network 100 may include a plurality of fully connected layers, with an output of one of the fully connected layers being received as an input by a subsequent fully connected layer.

An exemplary hierarchy for a general-purpose set of object definitions may include one or more of the following classes and subclasses:

Animal
  a. 2 legged
    i. Human
      1. . . . sub-classes (see below)
  b. 4 legged
    i. Feline
    ii. Canine
    iii. Equine
      1. Horse
      2. Zebra
    iv. Elephantidae
      1. African bush
      2. African forest
      3. Asian
  c. 6 legged
    i. . . .
  d. 8 legged
    i. . . .
  e. Fish
Mineral
  f. Gems
  g. Rocks
  h. Etc.
Vegetable
  i. Tree
    i. Evergreen
  j. Flower
  k. Bush
  l. Herb
Man made
  m. Furniture
    i. Chair
      1. Three leg chair
        a. Specific chair
      2. Four leg chair
    ii. Table
  n. White goods
    i.
  o. Painting
    i. Artist
      1. Specific painting by artist
  p. Car
    i. Manufacturer
      1. Model
        a. Year An exemplary set of finer-level object definitions for recognising a particular human individual may include one or more of the following subclasses:
1. Male/female
2. Eye colour (e.g. 3 groups)
3. Estimated age group (e.g. 4 groups)
4. Skin colour (e.g. 4 groups)
5. Face shape (e.g. 4 groups)
6. Height (e.g. 4 groups)

In the above examples, not all the classes may be detected even when detecting an individual with such characteristics. For example if a person is wearing dark glasses, the colour of the eyes may not be available.

In examples, an object classifier may be arranged to configure at least one of the first and second object classification cycles in response to control data derived from one or more data sources external to the object classifier. The one or more data sources may comprise one or more sensors external to the object classifier, the one or more sensors being arranged to generate sensor data. The control data may be derived at least in part from the sensor data.

In examples, the one or more data sources comprise a sensor arranged to sense an availability of a system resource of the image processing system and wherein the sensor data is indicative of the availability of the system resource. The availability of the system resource may comprise:
  a. a state of charge of an electric battery configured to power the image processing system;
  b. an amount of available storage accessible by the image processing system;
  c. an amount of compute resource available to the image processing system; or
  d. an amount of electrical power available to the image processing system.

In examples, the one or more data sources may be data sources integrated into, or associated with, a computing device, such as a personal computer, a laptop, a smartphone or an on-board computing device which may be coupled to or mounted within a vehicle such as a car. Such data sources may comprise one or more of:
  a. a location sensor arranged to generate sensor data indicative of geographic location;
  b. a temperature sensor arranged to generate sensor data indicative of ambient temperature;
  c. a visual information sensor arranged to generate sensor data indicative of semantic information in image data, such as barcode data and/or vehicle number plate recognition data;
  d. an audio information sensor arranged to generate sensor data indicative of audio data;
  e. a speed sensor arranged to generate sensor data indicative of a speed of travel;
  f. an acceleration sensor arranged to generate sensor data indicative of an amount of acceleration;
  g. a radio signal sensor arranged to generate sensor data indicative of data carried by a radio signal, such as Wi-Fi™ access point identity information;
  h. a movement sensor arranged to generate sensor data indicative of movement; and
  i. a simultaneous location and mapping (SLAM) module.

The following external inputs may also be used to control the configuration of at least one of the first and second object classification cycles:

a. data derived from a social network, relating to recognised people in the scene, or recently seen
b. data indicative of sensed user characteristics, such as language spoken, accent, characteristic sounds, etc. which may be sensed using a microphone.

In examples, the object classifier is arranged to configure at least one of the first and second object classification cycles in response to control data derived from the object classifier. The control data derived from the object classifier may comprise control data indicative of a classification of an object in an image frame in which object classification is performed during at least one of the first and second object classification cycles. The object classifier may be arranged to configure at least the second object classification cycle in response to control data derived from the object classifier, and the control data derived from the object classifier may alternatively, or in addition, comprise control data indicative of a classification of an object in an image frame in which object classification is performed during the first object classification cycle. The control data derived from the object classifier may alternatively, or in addition, comprise control data indicative of a classification of an object in an image frame which is selected for processing during an object classification cycle preceding the first and second object classification cycles.

In examples, the object classifier is arranged to perform object classification in the same given image frame during both the first and second object classification cycles. The object classifier may be arranged to perform the first object classification cycle as an initial object classification cycle in which object classification is first performed in the given image frame, and to perform the second object classification cycle as a subsequent object classification cycle in which object classification is performed in the given image frame.

In examples, the object classifier comprises a convolutional neural network which includes a plurality of convolutional layers and a fully connected layer. The object classifier may be arranged to perform object classification by:
a. processing image data representative of a given image frame in at least a first convolutional layer to generate first feature data in the first object classification cycle;
b. transferring the first feature data to a second layer, different than said first convolutional layer, as feature map data thereto; and
c. processing the first feature data using at least the second convolutional layer to generate second feature data during the second object classification cycle.

In other examples, the object classifier is arranged to perform object classification in a given image frame during the first object classification cycle and to perform object classification in an image frame subsequent to the given image frame during the second object classification cycle.

In examples, the object classifier is arranged to configure one or more object definitions from the set according to an execution pattern in which the one or more object definitions are periodically executed in selected object classification cycles in a sequence of object classification cycles, and not executed in other object classification cycles in the sequence.

In examples, the object classifier may be arranged to configure one or more coarse-level object definitions from the set according to a first execution pattern, and to configure one or more finer-level object definitions from the set according to a second execution pattern. The one or more coarse-level object definitions may be executed more frequently in the first execution pattern than the one or more finer-level object definitions are executed in the second execution pattern. The first execution pattern may comprise a series of consecutive object classification cycles, and the second execution pattern may comprise a series of non-consecutive object classification cycles.

In examples, the object classifier may be arranged to configure one or more coarse-level object definitions from the set according to a first coarse-level execution pattern, and to configure one or more coarse-level object definitions from the set according to a second coarse-level execution pattern. The first and second execution patterns may be non-overlapping; for example the patterns may alternate between cycles; and there may be three or more different patterns which activate in sequence.

Figure 2:
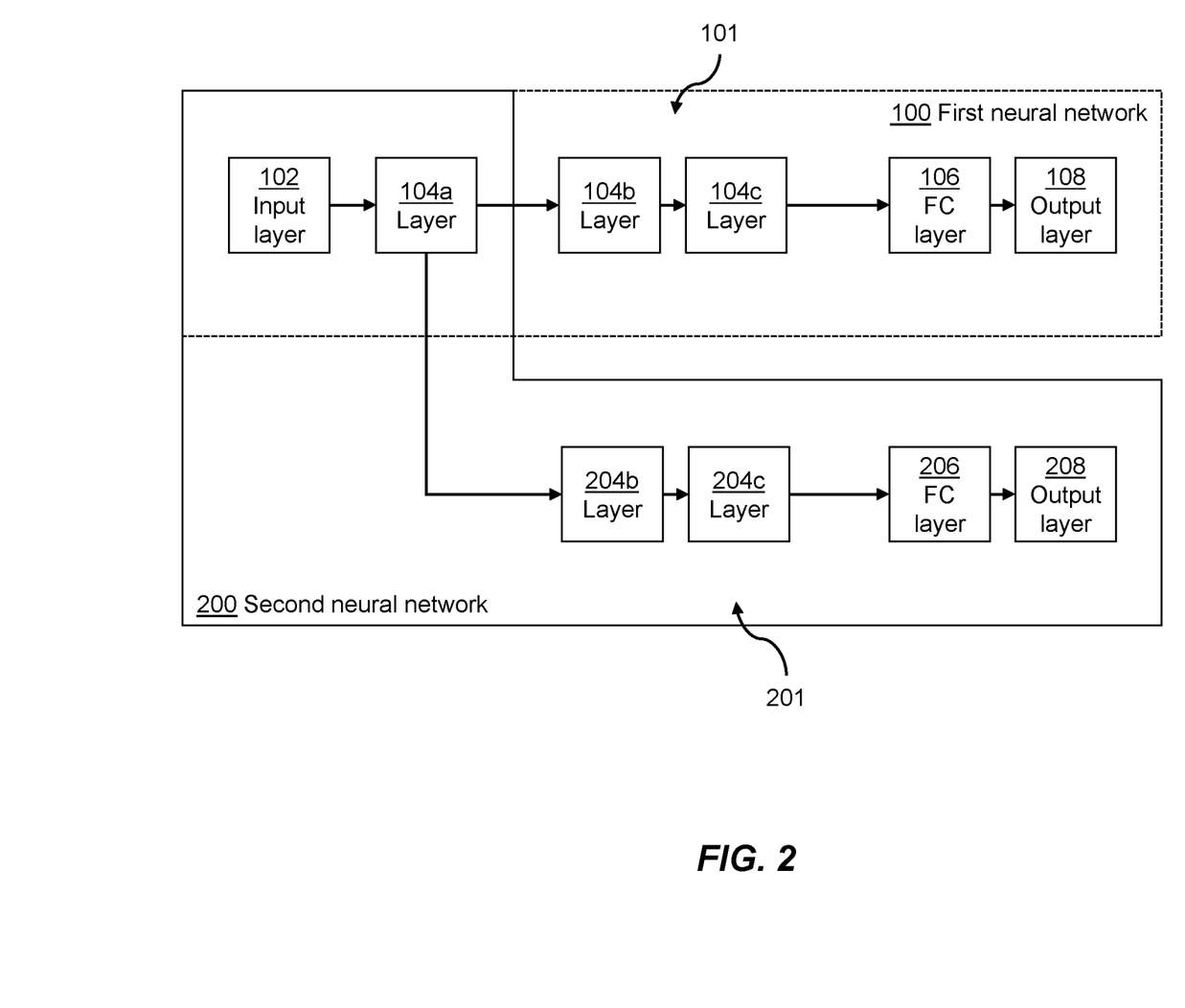
FIG. 2 schematically shows a neural network system and a second neural network system according to examples.

FIG. 2 shows an example in which the neural network 100 and a second neural network 200 share a convolutional layer 104a (and input layer 102). Feature data output by the shared layer 104a may be transferred and received as input data by the layer 104b when the first neural network 100 is selected to process image data received as the input layer 102, for example in a first object classification cycle. Subsequently, when the second neural network 200 is selected to process the image data, for example in a second object classification cycle, the output of the shared layer 104a may be received as input by the layer 204b. In examples, the first and second neural networks 100, 200 share a plurality of layers.

In examples, input image data representative of an input image is received and processed to segment the input image into a plurality of blocks. A block of the plurality of blocks for example corresponds to the image represented by the image data, which may be processed as described above. Each block may have a predetermined size, and may be considered to correspond to a tile of a larger image, such as the input image. The block may be any shape (not merely square or rectangular) and some blocks may be of a different shape and/or size than other blocks. The size of blocks may depend on the available processing capacity of an image processing system arranged to process the input image, or may be a fixed size. By dividing the input image into blocks, blocks which contain detected objects may be identified as regions of interest, for example, and may be subjected to further processing without processing of other blocks which do not contain detected objects (such as blocks of the image corresponding to a background of a scene, such as the sky or grass). This may reduce unnecessary processing of image data, by focusing resources on portions of the image that are more likely to contain objects of interest.

Figure 3:
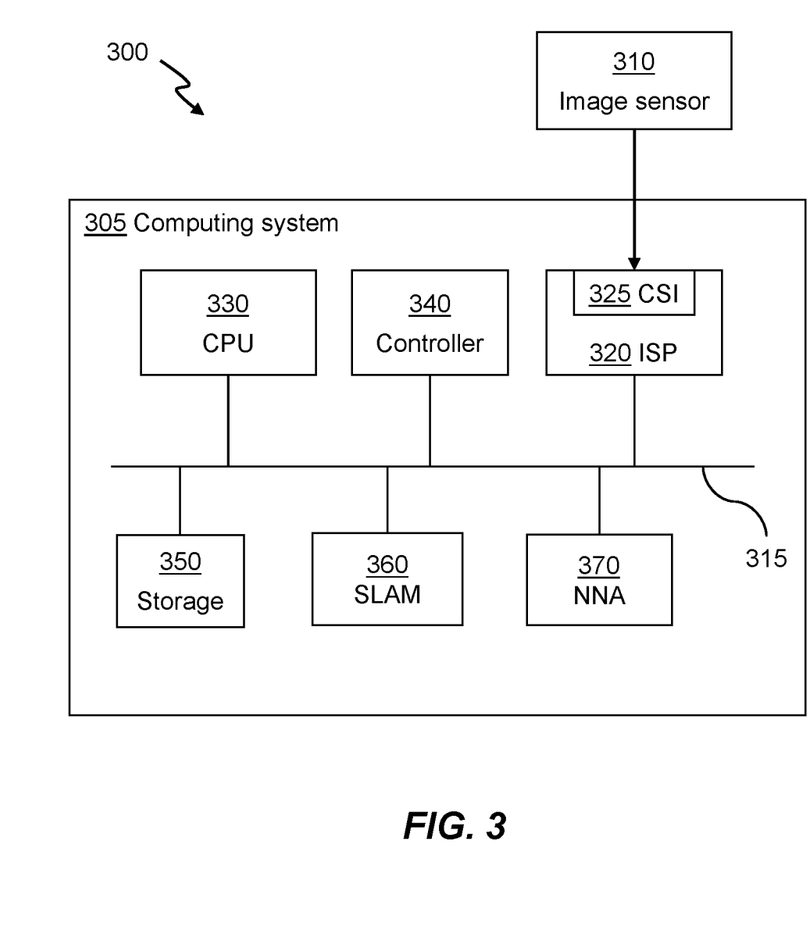
FIG. 3 shows schematically an example image processing system for use with the methods described herein.

An example of an image processing system 300 for use with the methods described herein is shown schematically in FIG. 3. The image processing system 300 of FIG. 3 may be coupled to or form part of a computing device, such as a personal computer, a laptop, a smartphone or an on-board computer device which may be coupled to or mounted within a vehicle such as a car.

The image processing system 300 of FIG. 3 includes an image sensor 310. An image sensor typically includes an array of sensor pixels, which may be any suitable photo-sensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 310 in this example is arranged to capture image data representative of an image. The image may form part of a video, which is typically a series of images captured sequentially. For example, the image may correspond to a frame of a video.

In FIG. 3, the image sensor 310 is arranged to transfer image data to an image signal processor (ISP) 320 of an image processing system 305 via a camera serial interface (CSI) 325. The ISP 320 may perform initial processing of the image data to prepare the image data for display. For example, the ISP 320 may perform saturation correction, renormalization, white balance adjustment and/or demosaicing, although this is not to be taken as limiting.

The image processing system 305 of FIG. 3 includes at least one processor. In this example, the image processing system 300 includes a central processor unit (CPU) 330. The image processing system 305 also includes at least one neural network accelerator. A neural network accelerator is, for example, a processor dedicated to implementing at least classification of data using a neural network. For example, a neural network accelerator may be a processor dedicated to implementing at least classification of data using a neural network. The at least one neural network accelerator is configured to implement first and second neural networks such as those described above. The at least one neural network accelerator may be a neural network accelerator (such as a single or sole neural network accelerator) configured to implement both the first and second neural networks.

In the example of FIG. 3, the image processing system includes a simultaneous location and mapping (SLAM) module 360 and a neural network accelerator (NNA) 370. in the example of FIG. 3, the neural network accelerator 370 is configured to implement a neural network such as that described above.

In other examples, though, the image processing system 305 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The image processing system 305 may also or alternatively include a processor implemented as a combination of computing devices, e.g., a combination of a DSP and a microprocessor, a plurality of microprocessors, one or more microprocessors in conjunction with a DSP core, or any other such configuration. The image processing system 305 may also or alternatively include at least one graphics processing unit (GPU). The first and/or second neural network may be implemented by one or more of these other processors in examples.

The image processing system 305 of FIG. 3 includes a controller 340 arranged to to, in accordance with the methods described herein, the controller 340 is arranged to control the configuration of the first and second object classification cycles. The controller may comprise hardware and/or software to control or configure the neural network. For example, the controller may be implemented at least in part by computer software stored in (non-transitory) memory and executable by the processor, or by hardware, or by a combination of tangibly stored software and hardware (and tangibly stored firmware). In some examples, the controller 340 includes a processor and a memory. Computer executable code that includes instructions for performing various operations of the controller described herein can be stored in the memory. For example, the functionality for controlling or interacting with the plurality of neural networks can be implemented as executable neural network control code stored in the memory and executed by the processor. As such, the executable code stored in the memory can include instructions for operations that when executed by processor cause the processor to implement the functionality described in reference to the example controller 340.

In other examples, the controller 340 may additionally or alternatively comprise a driver as part of the CPU 330. The driver may provide an interface between software configured to control or configure the neural networks and the at least one neural network accelerator which is configured to perform the processing to implement the neural networks. In other examples, though, a neural network may be implemented using a more general processor, such as the CPU or a GPU, as explained above. In addition to selecting the neural network to process the image data, as described herein, the controller 340 may be configured to control the transfer of the feature data from the neural network to the second neural network as described in particular examples.

The image processing system 305 of FIG. 3 also includes storage 350. The storage 350 is for example external to the neural network accelerator 370. The storage 350 may be a random access memory (RAM) such as DDR-SDRAM (double data rate synchronous dynamic random access memory). In other examples, the storage 350 may be or include a non-volatile memory such as Read Only Memory (ROM) or a solid state drive (SSD) such as Flash memory. The storage 350 in examples may include further storage devices, for example magnetic, optical or tape media, compact disc (CD), digital versatile disc (DVD) or other data storage media. The storage 350 may be removable or non-removable from the image processing system 305. The storage 350 is for example arranged to store image data representative of at least part of an image, which may be received from the ISP 320. In some examples, the image processing system 305 of FIG. 3 also includes a dynamic memory controller (DMC) which may be used to control access to the storage 350 of the image processing system 305.

The components of the image processing system 305 in the example of FIG. 3 are interconnected using a systems bus 315. This allows data to be transferred between the various components. The bus 315 may be, or include, any suitable interface or bus. For example, an ARM® Advanced Microcontroller Bus Architecture (AMBA®) interface, such as the Advanced eXtensible Interface (AXI), may be used.

The above examples are to be understood as illustrative examples. Further examples are envisaged. For example, although in examples described above the first and second neural networks are each CNNs, in other examples other types of neural network may be used as the first and/or second neural networks.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An image processing system comprising:
    an image data interface arranged to receive image data in the form of sequential image data frames representing a dynamic scene;
    an object classifier arranged to perform object classification in object classification cycles, wherein in a given object classification cycle the object classifier performs object classification in a selected image frame;

storage arranged to store categorization data, the categorization data comprising a set of object definitions for use by the object classifier, the set of object definitions being arranged in an object definition hierarchy and including at least a first group of coarse-level object definitions at a first object definition level and a second group of finer-level object definitions at a second object definition level which is below the first object definition level, wherein the object classifier is arranged to configure a first object classification cycle and a second, subsequent, object classification cycle by:

selecting a first subset of object definitions from the categorization data, the first subset being selected from at least one of the first and second group object definitions, and selectively executing the first subset in the first object classification cycle; and selecting a second subset of object definitions from the categorization data, the second subset being selected from at least one of the first and second group object definitions and being different than the first subset, and selectively executing the second subset in the second object classification cycle, wherein the object classifier is arranged to configure at least one of the first and second object classification cycles in response to control data derived from one or more data sources external to the object classifier.

2. An image processing system according to claim 1, wherein the one or more data sources comprise one or more sensors external to the object classifier, the one or more sensors being arranged to generate sensor data, and wherein the control data is derived from the sensor data.

3. An image processing system according to claim 2, wherein the one or more data sources comprise a sensor arranged to sense an availability of a system resource of the image processing system and wherein the sensor data is indicative of the availability of the system resource.

4. An image processing system according to claim 3, wherein the availability of the system resource comprises at least one of:

a state of charge of an electric battery configured to power the image processing system;

an amount of available storage accessible by the image processing system;

an amount of compute resource available to the image processing system; or an amount of electrical power available to the image processing system.

5. An image processing system according to claim 2, wherein the one or more data sources comprise one or more of:

a location sensor arranged to generate sensor data indicative of geographic location;

a temperature sensor arranged to generate sensor data indicative of ambient temperature;

a visual information sensor arranged to generate sensor data indicative of image data;

an audio information sensor arranged to generate sensor data indicative of audio data;

a speed sensor arranged to generate sensor data indicative of a speed of travel;

an acceleration sensor arranged to generate sensor data indicative of an amount of acceleration;

a radio signal sensor arranged to generate sensor data indicative of data carried by a radio signal;

a movement sensor arranged to generate sensor data indicative of movement; and a simultaneous location and mapping (SLAM) module.

6. An image processing system according to claim 1, wherein the object classifier is arranged to configure at least one of the first and second object classification cycles in response to control data derived from the object classifier.

7. An image processing system according to claim 6, wherein the control data derived from the object classifier comprises control data indicative of a classification of an object in an image frame in which object classification is performed during at least one of the first and second object classification cycles.

8. An image processing system according to claim 7, wherein the object classifier is arranged to configure at least the second object classification cycle in response to control data derived from the object classifier, wherein the control data derived from the object classifier comprises at least one of:

control data indicative of a classification of an object in an image frame in which object classification is performed during the first object classification cycle; or control data indicative of a classification of an object in an image frame which is selected for processing during an object classification cycle preceding the first and second object classification cycles.

9. An image processing system according to claim 1, wherein the object classifier is arranged to perform object classification in a given image frame during both the first and second object classification cycles.

10. An image processing system according to claim 9, wherein the object classifier is arranged to perform the first object classification cycle as an initial object classification cycle in which object classification is first performed in the given image frame, and to perform the second object classification cycle as a subsequent object classification cycle in which object classification is performed in the given image frame.

11. An image processing system according to claim 9, wherein the object classifier comprises a convolutional neural network which includes a plurality of convolutional layers and a fully connected layer, and wherein the object classifier is arranged to perform object classification by:

processing image data representative of a given image frame in at least a first convolutional layer to generate first feature data in the first object classification cycle;

transferring the first feature data to a second layer, different than said first convolutional layer, as feature map data thereto; and processing the first feature data using at least the second convolutional layer to generate second feature data during the second object classification cycle.

12. An image processing system according to claim 1, wherein the object classifier is arranged to perform object classification in a given image frame during the first object classification cycle and to perform object classification in an image frame subsequent to the given image frame during the second object classification cycle.

13. An image processing system according to claim 1, wherein the object classifier is arranged to configure one or more object definitions from the set according to an execution pattern in which the one or more object definitions are periodically executed in selected object classification cycles in a sequence of object classification cycles, and not executed in other object classification cycles in the sequence.

14. An image processing system according to claim 13, wherein the object classifier is arranged to configure at least one of:

(i) one or more coarse-level object definitions from the set according to a first execution pattern, and one or more finer-level object definitions from the set according to a second execution pattern, wherein the one or more coarse-level object definitions are executed more frequently in the first execution pattern than the one or more finer-level object definitions are executed in the second execution pattern; or (ii) one or more coarse-level object definitions from the set according to a first coarse-level execution pattern, and one or more coarse-level object definitions from the set according to a second coarse-level execution pattern, wherein the first and second execution patterns are non-overlapping.

15. An image processing system according to claim 14, in accordance with (i), wherein the first execution pattern comprises a series of consecutive object classification cycles, and the second execution pattern comprises a series of non-consecutive object classification cycles.

16. An image processing system according to claim 1, wherein the object classifier is arranged to be executed in at least one processor, the at least one processor comprising a neural network accelerator.

17. A method of processing image data, the method comprising:

receiving image data in the form of sequential image data frames representing a dynamic scene;

performing object classification in object classification cycles, wherein in a given object classification cycle, object classification is performed in a selected image frame;

storing categorization data, the categorization data comprising a set of object definitions for use during object classification; and configuring a first object classification cycle and a second, subsequent, object classification cycle by:

selecting a first subset of object definitions from the categorization data, the first subset being selected from at least one of the first and second group object definitions, and selectively executing the first subset in the first object classification cycle; and selecting a second subset of object definitions from the categorization data, the second subset being selected from at least one of the first and second group object definitions and being different than the first subset, and selectively executing the second subset in the second object classification cycle, wherein at least one of the first and second object classification cycles is configured in response to control data derived from one or more data sources external to an object classifier performing the object classification.

18. A method according to claim 17, wherein the set of object definitions are arranged in an object definition hierarchy and include at least a first group of coarse-level object definitions at a first object definition level and a second group of finer-level object definitions at a second object definition level which is below the first object definition level.

19. A non-transitory computer-readable storage medium storing instructions that, when executed by a processor, cause the processor to:

receive image data in the form of sequential image data frames representing a dynamic scene;

perform object classification in object classification cycles, wherein in a given object classification cycle, object classification is performed in a selected image frame;

store categorization data, the categorization data comprising a set of object definitions for use during object classification; and configure a first object classification cycle and a second, subsequent, object classification cycle by:

selecting a first subset of object definitions from the categorization data, the first subset being selected from at least one of the first and second group object definitions, and selectively executing the first subset in the first object classification cycle; and selecting a second subset of object definitions from the categorization data, the second subset being selected from at least one of the first and second group object definitions and being different than the first subset, and selectively executing the second subset in the second object classification cycle, wherein at least one of the first and second object classification cycles is configured in response to control data derived from one or more data sources external to an object classifier performing the object classification.

* * * * *